UNITED STATES PATENT OFFICE.

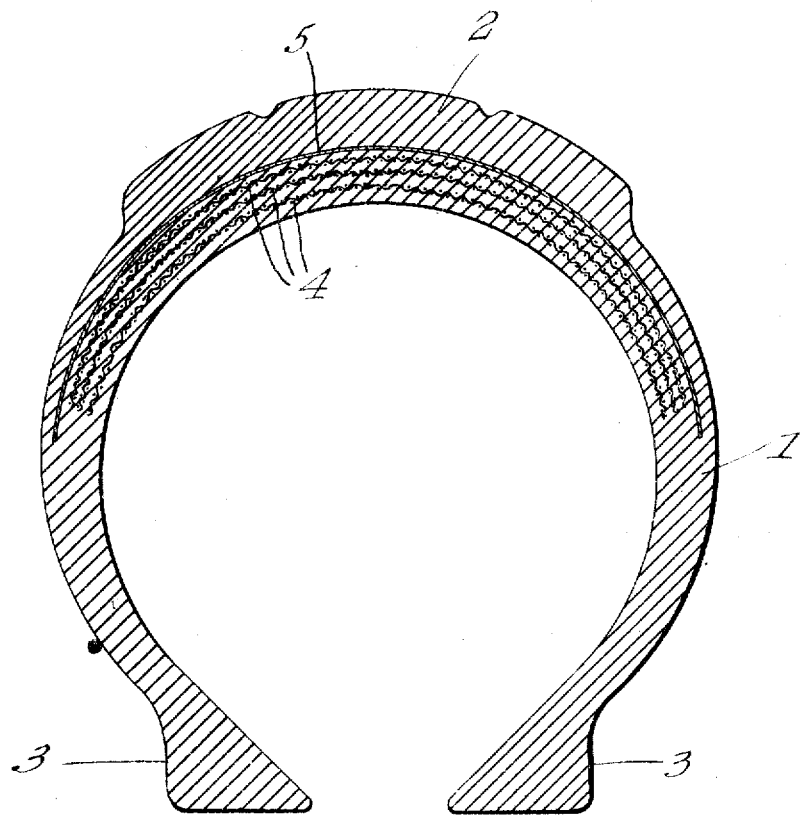

MARY PIERSON MITCHELL, OF EATON, OHIO.

TIRE.

1,410,704. Specification of Letters Patent. Patented Mar. 28, 1922.

Application filed February 17, 1919. Serial No. 277,643.

*To all whom it may concern:*

Be it known that I, MARY PIERSON MITCHELL, a citizen of the United States, residing at Eaton, in the county of Preble and State of Ohio, have invented a new and useful Tire, of which the following is a specification.

The device forming the subject matter of this application is a tire, and it is the object of the invention, generally stated, to produce a tire which will withstand hard and long continued use, without deteriorating to the extent which characterizes tires as at present constructed.

The invention aims to supply a tire which will be practically puncture-proof, and so to construct the tire that it will not overheat.

Another object of the invention, is to provide a tire in which the puncture-resisting members, being flexible, will in no wise detract from the flexibility of the article.

Further, the invention contemplates that, through a novel construction, the puncture-resisting members shall be firmly, and securely incorporated in the tire carcass, so as to reenforce the same, without producing undesirable stiffness.

With the above and other objects in view, the invention consists in the novel construction and arrangement of parts, hereinafter described, depicted in the accompanying drawings which form a part of this application, and set forth specifically in the appended claim, it being understood that, within the scope of what is claimed, divers changes in the size of the parts, and such other changes as might fall within the skill of a mechanic, may be made, without departing from the spirit of the invention or sacrificing the utility thereof.

One form which my invention may take, is disclosed in a single cross-sectional view, in the drawings.

In carrying out the invention, there is provided a casing 1 which may be constructed along any line dictated by the experience of those skilled in the art to which the invention appertains. Ordinarily, the casing 1 is made of rubber, rubberized fabric, or a combination of these or other materials. It is common to provide such a part as the casing 1, with an anti-skid surface 2 of some kind, forming a more or less pronounced tread. The casing 1 is suitably constructed, as indicated at 3, to cooperate with a rim (not shown), but since the casing may be assembled with a rim by means of any of the common instrumentalities used for that purpose, the specific rim-engaging means shown in the drawings is not to be considered as a mandatory and limiting construction. In the casing 1, whatever be its specific form, a plurality of transverse reenforcements are embedded, in spaced relation to each other, these reenforcements, of course, extending circumferentially of the casing. Preferably, the reenforcements consist of layers of fine-mesh wire netting, possessing flexibility as one of its characteristics. It may be found desirable to use, in the making of the netting, some metal which will resist rust and the deleterious and pernicious effects of moisture. A breaker strip 5 is embedded in the casing 1, between the netting layers 4 and the tread surface of the casing, and at this point it may be remarked that as many or as few layers of netting as is found to be expedient, may be employed. The constituent material of the breaker strip may be dictated by the exigencies of the proposed use, by the taste of the manufacturer, or by the bias of the purchaser, but the breaker strip advantageously may be fashioned from a refractory heat-resisting material, and, relying upon my experience, asbestos is recommended as a satisfactory substance from which the breaker strip may be constructed. An asbestos breaker strip, located as described, will prevent an over-heating of the casing but it is not obligatory that the breaker strip be used.

In preparing the layers 4 of wire netting for use in the building up of the casing, they may be thoroughly coated with cement, a tenacious resilient vulcanizable cement being preferred. The cement is permitted to dry partially on the netting, before the latter is incorporated in the casing. Ordinarily, the cement is allowed to dry until it adheres slightly to the finger, without leaving a deposit thereon. This treatment of the netting insures a perfect incorporation of the netting in the casing, and produces a casing characterized by the highest degree of approach to homogeneity possible in a device embodying elements having different physical properties. It has been stated hereinbefore, that the layers 4 are flexible and, consequently, the complete casing will not be stiff, unyielding, and unresponsive to pressure. At the same time, however, the layers 4 of netting will afford an adequate protection against puncture, and will serve to a marked and important degree, as a reenforcement for the casing.

The device forming the subject matter of this application embodies a tire casing which will resist puncture, the casing being devoid of stiffness, inflexibility, and those other concomitant disadvantages which arise when a tire casing is reenforced by metal plates, either perforated or imperforate.

I claim:—

In a device of the class described, a tire casing comprising layers of rubberized fabric, between which a layer of fine mesh wire netting is interposed and vulcanized, the netting being flexible and being fashioned from moisture-resisting material, the netting being coated with tenacious, resilient, vulcanizable cement, which is in a partially dried condition prior to the mounting of the netting between the layers of fabric.

In testimony that I claim the foregoing as my own, I have hereto affixed my signature.

MARY PIERSON MITCHELL.